(12) United States Patent
Li et al.

(10) Patent No.: US 12,095,535 B2
(45) Date of Patent: Sep. 17, 2024

(54) CONFIGURATION OF CHANNEL STATE INFORMATION REFERENCE SIGNALS FOR WIRELESS COMMUNICATION SYSTEMS

(71) Applicant: ZTE Corporation, Guangdong (CN)

(72) Inventors: Yong Li, Guangdong (CN); Hao Wu, Guangdong (CN); Chuangxin Jiang, Guangdong (CN); Zhaohua Lu, Guangdong (CN)

(73) Assignee: ZTE Corporation, Guangdong (CN)

( * ) Notice: Subject to any disclaimer, the term of this patent is extended or adjusted under 35 U.S.C. 154(b) by 184 days.

(21) Appl. No.: 17/812,115

(22) Filed: Jul. 12, 2022

(65) Prior Publication Data

US 2022/0352951 A1 Nov. 3, 2022

Related U.S. Application Data

(63) Continuation of application No. PCT/CN2020/121088, filed on Oct. 15, 2020.

(51) Int. Cl.
*H04B 7/06* (2006.01)
*H04B 7/0456* (2017.01)
*H04L 5/00* (2006.01)

(52) U.S. Cl.
CPC ......... *H04B 7/0626* (2013.01); *H04B 7/0456* (2013.01); *H04L 5/0051* (2013.01)

(58) Field of Classification Search
CPC .... H04B 7/0456; H04B 7/0626; H04B 7/063; H04B 7/0632; H04B 7/0639;
(Continued)

(56) References Cited

U.S. PATENT DOCUMENTS 9,020,051 B2 * 4/2015 Lee .................. H04L 5/0091
375/267
9,668,253 B2 * 5/2017 Lee .................. H04L 5/0091
(Continued)

FOREIGN PATENT DOCUMENTS

| EP | 3429092 | 1/2019 |
|---|---|---|
| WO | 2018//229078 | 12/2018 |
| WO | 2019/051634 | 3/2019 |

OTHER PUBLICATIONS

Samsung, "Draft CR for modification on CSI test cases: section 6, 8, 10," 3GPP TSG RAN4 #90bis, Xi'an, China, R4-1904768, 66 pages, Apr. 8-12, 2019.
(Continued)

*Primary Examiner* — James M Perez
(74) *Attorney, Agent, or Firm* — Perkins Coie LLP

(57) ABSTRACT

Methods, systems, and devices for configuring channel state information (CSI) reference signals (RS) in mobile communication technology are described. An example method for wireless communication includes transmitting, by a network node to a wireless device, a configuration of at least one CSI-RS and a configuration of a CSI report, transmitting, based on the configuration over one or more CSI-RS resources, the at least one CSI-RS, and receiving, from the wireless device, the CSI report based on the configuration of the CSI report. The configuration of the CSI report may comprise one or more of the following: a number of CSI-RS ports related to a specific number of frequency basis vectors, or an index of a frequency basis vector corresponding to the specific number.

20 Claims, 4 Drawing Sheets

Transmitting, by a network node to a wireless device, a configuration of at least one channel state information (CSI) reference signal (RS) and a configuration of a CSI report ⟶ 210

Transmitting, based on the configuration over one or more CSI-RS resources, the at least one CSI-RS ⟶ 220

Receiving, from the wireless device, the CSI report based on the configuration of the CSI report ⟶ 230

(58) Field of Classification Search
CPC .... H04B 7/0645; H04B 17/30; H04B 17/373; H04B 17/391; H04B 17/3913; H04L 5/0051
See application file for complete search history.

(56) References Cited

U.S. PATENT DOCUMENTS

| | | | | |
|---|---|---|---|---|
| 9,681,425 | B2* | 6/2017 | Geirhofer | H04B 7/0621 |
| 9,973,309 | B2* | 5/2018 | Lee | H04J 11/00 |
| 10,014,916 | B2* | 7/2018 | Yuan | H04B 17/373 |
| 10,305,866 | B2* | 5/2019 | Song | H04L 63/0428 |
| 10,560,162 | B2* | 2/2020 | Liu | H04B 7/0486 |
| 10,742,296 | B2* | 8/2020 | He | H04W 72/04 |
| 10,911,122 | B2* | 2/2021 | Wu | H04L 5/0048 |
| 11,018,737 | B2* | 5/2021 | Park | H04B 7/0478 |
| 11,129,192 | B2* | 9/2021 | Kela | H04W 72/1263 |
| 11,146,317 | B2* | 10/2021 | Jin | H04B 7/0634 |
| 11,239,887 | B2* | 2/2022 | Gao | H04B 7/0456 |
| 11,245,444 | B2* | 2/2022 | Faxér | H04B 7/0417 |
| 11,245,451 | B2* | 2/2022 | Hao | H04W 72/53 |
| 11,290,164 | B2* | 3/2022 | Zhang | H04L 5/0057 |
| 11,349,541 | B2* | 5/2022 | Li | H04L 1/06 |
| 11,405,930 | B2* | 8/2022 | Tong | H04W 72/541 |
| 11,456,786 | B2* | 9/2022 | Wang | H04L 5/0003 |
| 11,483,042 | B2* | 10/2022 | Xue | H04L 1/1861 |
| 11,553,521 | B2* | 1/2023 | Li | H04W 72/23 |
| 11,569,961 | B2* | 1/2023 | Farmanbar | H04B 7/0626 |
| 11,595,089 | B2* | 2/2023 | Ramireddy | H04B 7/10 |
| 11,616,551 | B2* | 3/2023 | Großmann | H04B 7/0634 370/329 |
| 11,683,076 | B2* | 6/2023 | Wu | H04B 7/0456 375/267 |
| 11,736,170 | B2* | 8/2023 | Li | H04B 7/0486 370/329 |
| 11,757,495 | B2* | 9/2023 | Faxér | H04B 7/0802 370/329 |
| 11,804,884 | B2* | 10/2023 | Xu | H04B 7/0456 |
| 11,848,729 | B2* | 12/2023 | Wang | H04B 7/0478 |
| 11,870,525 | B2* | 1/2024 | Hang | H04L 5/0051 |
| 11,901,993 | B1* | 2/2024 | Kim | H04L 5/0051 |
| 2011/0235743 | A1* | 9/2011 | Lee | H04L 5/0053 375/295 |
| 2012/0093089 | A1* | 4/2012 | Park | H04B 7/0626 370/328 |
| 2013/0114656 | A1* | 5/2013 | Sayana | H04B 7/024 375/260 |
| 2013/0343215 | A1* | 12/2013 | Li | H04B 7/0417 370/252 |
| 2014/0086285 | A1* | 3/2014 | Yang | H04B 7/0417 375/219 |
| 2015/0208397 | A1* | 7/2015 | Lee | H04W 72/23 370/329 |
| 2015/0223161 | A1* | 8/2015 | Xiao | H04L 5/0057 370/329 |
| 2015/0288499 | A1* | 10/2015 | Nam | H04B 7/0647 370/329 |
| 2016/0088646 | A1* | 3/2016 | Sun | H04L 1/0028 370/329 |
| 2016/0135180 | A1* | 5/2016 | Yuan | H01Q 21/22 370/329 |
| 2017/0012724 | A1* | 1/2017 | Zirwas | H04B 17/373 |
| 2017/0237533 | A1* | 8/2017 | Lee | H04L 5/0048 375/260 |
| 2019/0007119 | A1* | 1/2019 | Su | H04B 7/0639 |
| 2019/0028157 | A1* | 1/2019 | Gao | H04L 5/0044 |
| 2019/0132031 | A1* | 5/2019 | Park | H04B 7/0626 |
| 2019/0335474 | A1* | 10/2019 | Tang | H04B 7/0695 |
| 2020/0106491 | A1* | 4/2020 | Wu | H04L 1/16 |
| 2020/0119794 | A1* | 4/2020 | Wu | H04B 7/0456 |
| 2020/0162142 | A1* | 5/2020 | Rahman | H04B 7/0639 |
| 2020/0204229 | A1* | 6/2020 | Jin | H04B 7/0469 |
| 2020/0229201 | A1* | 7/2020 | Tong | H04B 7/0632 |
| 2020/0329496 | A1* | 10/2020 | Li | H04W 72/1273 |
| 2020/0358503 | A1* | 11/2020 | Hao | H04W 72/23 |
| 2021/0067297 | A1* | 3/2021 | Farmanbar | H04B 7/0417 |
| 2021/0143870 | A1* | 5/2021 | Faxér | H04L 5/0057 |
| 2021/0143885 | A1* | 5/2021 | Großmann | H04B 7/0478 |
| 2021/0226674 | A1* | 7/2021 | Ramireddy | H04B 7/0417 |
| 2021/0234583 | A1* | 7/2021 | Wang | H04L 5/0003 |
| 2021/0250076 | A1* | 8/2021 | Jin | H04B 7/0634 |
| 2021/0288707 | A1* | 9/2021 | Hang | H04B 7/026 |
| 2021/0336665 | A1* | 10/2021 | Jin | H04B 7/0634 |
| 2021/0376895 | A1* | 12/2021 | Xue | H04B 7/0626 |
| 2022/0029676 | A1* | 1/2022 | Ramireddy | H04B 7/0626 |
| 2022/0166469 | A1* | 5/2022 | Faxér | H04L 5/005 |
| 2022/0329305 | A1* | 10/2022 | Ren | H04B 7/0626 |
| 2022/0352951 | A1* | 11/2022 | Li | H04B 7/0626 |
| 2022/0393743 | A1* | 12/2022 | Tosato | H04B 7/0456 |
| 2022/0416858 | A1* | 12/2022 | Wang | H04B 7/0469 |
| 2022/0417779 | A1* | 12/2022 | Madadi | H04W 24/10 |
| 2023/0122302 | A1* | 4/2023 | Wang | H04B 7/063 370/329 |
| 2023/0208494 | A1* | 6/2023 | Großmann | H04B 7/0617 370/329 |
| 2023/0412225 | A1* | 12/2023 | Tosato | H04B 7/0658 |
| 2023/0421219 | A1* | 12/2023 | Jiang | H04B 7/0626 |
| 2024/0007164 | A1* | 1/2024 | Zhang | H04B 7/0478 |
| 2024/0048203 | A1* | 2/2024 | Wang | H04B 7/0626 |
| 2024/0056154 | A1* | 2/2024 | Kim | H04B 7/0417 |
| 2024/0063854 | A1* | 2/2024 | Athley | H04L 5/0023 |
| 2024/0072858 | A1* | 2/2024 | Wang | H04B 7/0469 |
| 2024/0080078 | A1* | 3/2024 | Li | H04B 7/0626 |
| 2024/0154671 | A1* | 5/2024 | Zhang | H04B 7/0639 |
| 2024/0171433 | A1* | 5/2024 | Ahmed | H04B 7/0626 |

OTHER PUBLICATIONS

ZTE, "Preliminary views on further enhancements for NR MIMO," 3GPP TSG RAN WG1 #101-e, e-Meeting, R1-2003483, 18 pages, May 25-Jun. 5, 2020.
International Search Report and Written Opinion for International Application No. PCT/CN2020/121088, mailed on Jul. 14, 2021 (8 pages).
Apple Inc. "Views on Rel-17 CSI enhancement" 3GPP TSG-RAN WG1 Meeting #103-e R1-2008444, e-Meeting, Oct. 26-Nov. 13, 2020 6 pages.
Samsung "Views on Rel. 17 CSI enhancements" 3GPP TSG RAN WG1#103-e R1-2008154, e-Meeting, Oct. 26-Nov. 13, 2020, 10 pages.
CMCC "Enhancements on CSI reporting for Multi-TRP" 3GPP TSG RAN WG1 #103-e R1-2008006 e-Meeting, Oct. 26-Nov. 13, 2020, 3 pages.
OPPO "CSI enhancements: MTRP and FR1 FDD reciprocity" 3GPP TSG RAN WG1 #103e R1-2008223, e-Meeting, Oct. 26-Nov. 13, 2020, 10 pages.
ZTE "CSI enhancements for Multi-TRP and FR1 FDD reciprocity" 3GPP TSG RAN WG1 #103-e R1-2007769 e-Meeting, Oct. 26-Nov. 13, 2020, 13 pages.
Vivo "Further discussion and evaluation on MTRP CSI and partial reciprocity" 3GPP TSG RAN WG1 #103-e R1-2007650, e-Meeting, Oct. 26-Nov. 13, 2020, 24 page.
InterDigital, Inc. "CSI Enhancements for the Support of MTRP and FDD Reciprocity" 3GPP TSG RAN WG1 #103-e R1-2007632e-Meeting, Oct. 26-Nov. 13, 2020, 8 pages.
Huawei, et al "Discussion on CSI enhancements for Rel-17" 3GPP TSG RAN WG1 Meeting #103-e R1-2007592, E-meeting, Oct. 26-Nov. 13, 2020, 18 pages.
CATT "CSI enhancements for MTRP and FR1 FDD with partial reciprocity" 3GPP TSG RAN WG1 Meeting #103-e R1-2007830, e-Meeting, Oct. 26-Nov. 13, 2020, 10 pages.
Huawei, HiSilicon "Technical Categorization for CSI enhancements MTRP and FR1 FDD reciprocity" 3GPP TSG RAN WG1 Meeting #102-e R1-2007268, E-meeting, Aug. 17-28, 2020, 17 pages.
Intel Corporation "On CSI enhancements for MTRP and FDD reciprocity" 3GPP TSG RAN WG1 103-e R1-2008983, e-Meeting, Oct. 26-Nov. 13, 2020, 12 pages.
NTT Docomo, Inc "Discussion on CSI enhancements" 3GPP TSG RAN WG1 #103-e R1-2009180 e-Meeting, Oct. 26-Nov. 13, 2020, 11 pages.

(56) References Cited

OTHER PUBLICATIONS

LG Electronics "CSI enhancements for Rel-17" 3GPP TSG RAN WG1 #103-e R1-2008579, e-Meeting, Oct. 26-Nov. 13, 2020, 8 pages.
Nokia et al. "Enhancement on CSI measurement and reporting" GPP TSG RAN WG1 Meeting #103-e R1-2008909, e-Meeting, Oct. 26-Nov. 13, 2020, 21 pages.
Spreadtrum Communications "Discussion on CSI enhancement for multi-TRP and FR1 FDD reciprocity" 3GPP TSG RAN WG1 #103-e R1-2009147, e-Meeting, Oct. 26-Nov. 13, 2020, 5 pages.
MediaTek, Inc. "CSI Enhancement for Multi-TRP" 3GPP TSG RAN WG1 #103-e R1-2008960 e-Meeting, Oct. 26-Nov. 13, 2020, 4 pages.
Lenovo, et al. "CSI enhancements for mTRP and FDD reciprocity" 3GPP TSG RAN WG1 #103e R1-2009100, e-Meeting, Oct. 26-Nov. 13, 2020, 8 pages.
Fraunhofer IIS, Fraunhofer HHI "CSI enhancements on Type II PS codebook and multi-TRP," 3GPP TSG RAN WG1 #103-e R1-2008901, e-Meeting, Oct. 26-Nov. 13, 2020, 11 pages.
Ericsson "On CSI enhancements in Rel-17 feMIMO" 3GPP TSG-RAN WG1 Meeting #103-e R1-2009224, Online, Oct. 26-Nov. 13, 2020, 10 pages.
Qualcomm Inc. "CSI enhancements: MTRP and FR1 FDD reciprocity" 3GPP TSG RAN WG1 #103-e R1-2009256, e-Meeting, Oct. 26-Nov. 13, 2020, 13 pages.
Extended European Search Report for Co-Pending EP Application No. 20957104.1, mailed on Oct. 12, 2023 (15 pages).

\* cited by examiner

CONFIGURATION OF CHANNEL STATE INFORMATION REFERENCE SIGNALS FOR WIRELESS COMMUNICATION SYSTEMS

CROSS-REFERENCE TO RELATED APPLICATION

This application is a continuation and claims priority to International Application No. PCT/CN2020/121088, filed on Oct. 15, 2020, the disclosure of which is hereby incorporated by reference herein in its entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide support for an increased number of users and devices, as well as support for higher data rates.

SUMMARY

This document relates to methods, systems, and devices for the configuration of channel state information (CSI) reference signals (RS) in mobile communication technology, including 5th Generation (5G) and New Radio (NR) communication systems.

In one exemplary aspect, a wireless communication method is disclosed. The method includes transmitting, by a network node to a wireless device, a configuration of at least one channel state information (CSI) reference signal (RS) and a configuration of a CSI report, transmitting, based on the configuration over one or more CSI-RS resources, the at least one CSI-RS, and receiving, from the wireless device, the CSI report based on the configuration of the CSI report.

In another exemplary aspect, a wireless communication method is disclosed. The method includes receiving, by a wireless device from a network node, a configuration of at least one channel state information (CSI) reference signal (RS) and a configuration of a CSI report, receiving, subsequent to receive the configuration over one or more CSI-RS resources, the at least one CSI-RS, and transmitting, to the network node, the CSI report, wherein the CSI report is generated based on the configuration of the CSI report.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

In orthogonal frequency division multiplexing (OFDM)-based wireless techniques, an OFDM symbol is the minimum time unit and a subcarrier is the minimum frequency unit, and all the OFDM symbols and all the subcarriers constitute a resource grid. Each element in the resource grid is called a resource element (RE). In some implementations, slots are used where a slot is composed of a specified number of OFDM symbols. In other implementations, resource blocks (RB) are used where a RB is composed of a specified number of subcarriers, and each RB has an index number.

Communication between wireless devices (e.g., UE, wireless node, etc.) and network nodes (e.g., gNodeB, eNB, base station, etc.) can be configured based on a transmission strategy that takes into account channel state information (CSI), which can improve the efficiency. Users in emerging systems expect lower complexity with higher performance for data transmission efficiency, and embodiments of the disclosed technology provide this based on, for example, the configuration of CSI reference signals.

Figure 1:
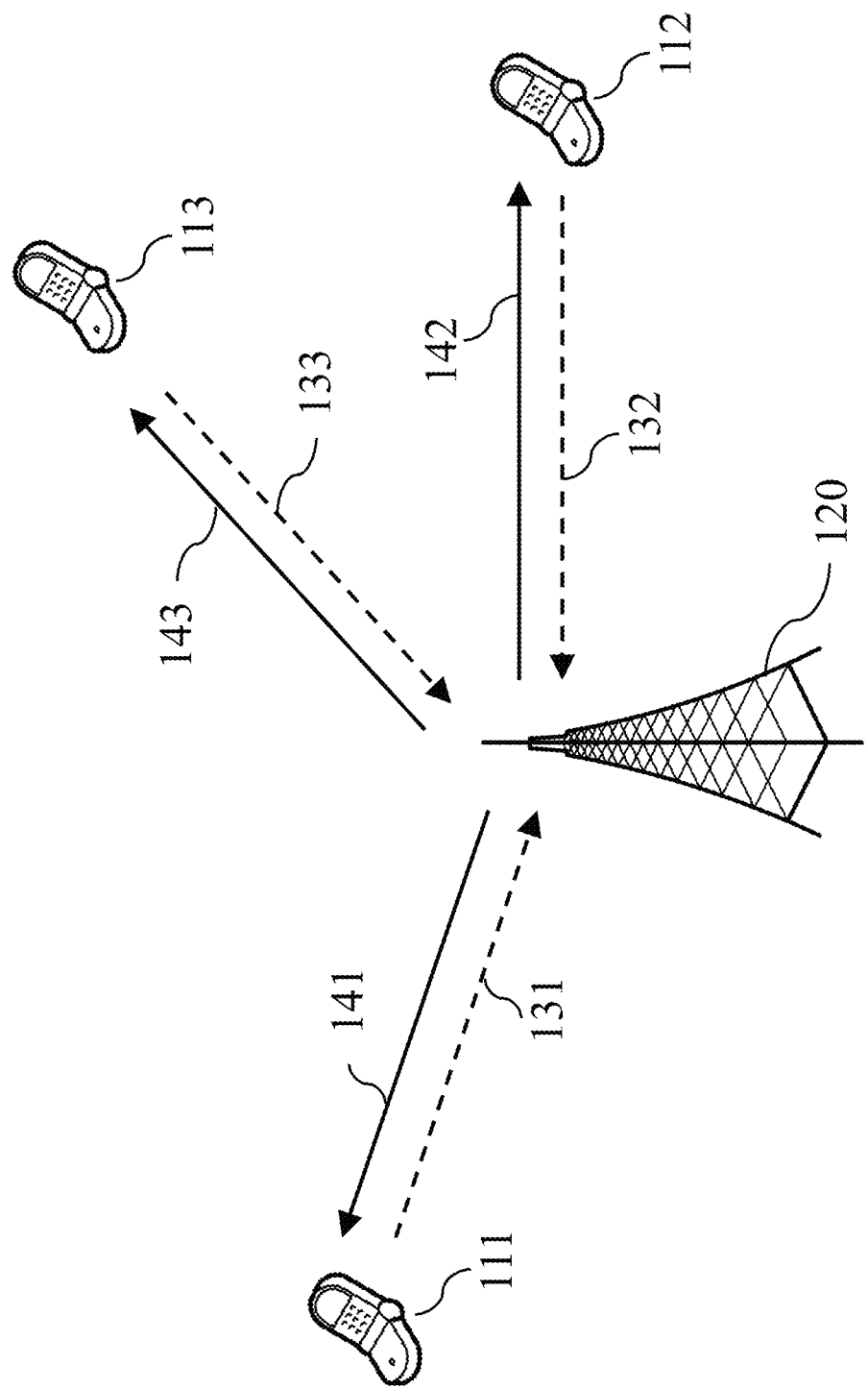
FIG. 1 shows an example of a base station (BS) and user equipment (UE) in wireless communication, in accordance with some embodiments of the presently disclosed technology.

FIG. 1 shows an example of a wireless communication system (e.g., an LTE, 5G or New Radio (NR) cellular network) that includes a BS 120 and one or more user equipment (UE) 111, 112 and 113. In some embodiments, the downlink transmissions (141, 142, 143) include configurations of the CSI report and CSI-RS(s). In response, the UEs transmit (131, 132, 133) the CSI report to the BS 120. The UE may be, for example, a smartphone, a tablet, a mobile computer, a machine to machine (M2M) device, a terminal, a mobile device, an Internet of Things (IoT) device, and so on.

The present document uses section headings and sub-headings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

Embodiments of the disclosed technology provide example methods for using a channel state information (CSI) reference signal (RS) to improve communication efficiency.

In an example method, a wireless communication node (e.g., gNB, eNB, base station) determines a configuration of CSI-RS, transmits the configuration of CSI-RS(s) to a wireless communication device (e.g., UE, wireless node) to indicate the forthcoming transmission of the CSI-RS, and then transmits the CSI-RS. The wireless communication device receives the configuration of CSI-RS and then receives the CSI-RS according to the configuration of CSI-RS.

In another example method, the wireless communication node determines a configuration of a CSI report and transmits the configuration of the CSI report to the wireless communication device. The wireless communication device receives the configuration of the CSI report, and then transmits the CSI report to the wireless communication node according to the configuration of the CSI report. The wireless communication node receives the CSI report.

In these example methods, the CSI-RS is transmitted with a CSI-RS port and carried by a CSI-RS resource, wherein the CSI-RS port is mapped to the CSI-RS resource.

1. Overview

The configuration of the CSI-RS may comprise one or more of the following: a number of CSI-RS ports, an index of the CSI-RS resource carrying the CSI-RS, a position of the CSI-RS resource carrying the CSI-RS, a CSI-RS density, a frequency range of the CSI-RS resource carrying the CSI-RS, an indicator for a mapping between the CSI-RS port and the CSI-RS resource. In these example configurations, the position of the CSI-RS resource can be configured as a time position, a frequency position, a position in a CSI-RS resource set, or a combination of any of the three positions. Furthermore, the CSI-RS density refers to the CSI-RS resource density.

The configuration of the CSI report may comprise one or more of the following: information to be reported, an amount of information, an order of the information to be transmitted, a frequency range of the CSI report, a channel used to transmit the CSI report, a CSI-RS associated with the CSI report, a CSI-RS port index related to a specific number of frequency basis vectors, a number of the CSI-RS ports related to a specific number of frequency basis vectors, and an index of the frequency basis vector corresponding to the specific number.

The configuration comprising the CSI-RS port index related to the specific number of frequency basis vectors enables the device to only measure the CSI-RS ports for the CSI related to the specific number of frequency basis vectors, instead of (i) all the CSI-RS ports for the CSI related to the specific number of frequency basis vectors or (ii) the CSI-RS ports for the CSI related to all the frequency basis vectors. This advantageously reduces the complexity of the device.

The configuration comprising the index of the frequency basis vector corresponding to the specific number enables the device to only measure CSI-RS ports for the CSI related to the frequency basis vectors indexed by the corresponding index, instead of all the other frequency basis vectors. This also reduces the complexity of the device.

The configuration comprising the combination of indexes of the frequency basis vectors of the specific number and the CSI-RS port indexes related to those frequency basis vectors enables the device to measure the CSI-RS ports and the frequency basis vectors for the CSI with a high degree of accuracy, as compared to blind detection methods. Herein, the complexity of the device is reduced because operations with blind detection methods are reduced.

2. Example of a Configuration Comprising a Number of CSI-RS Ports

In some embodiments, the configuration of the CSI-RS or the configuration of the CSI report comprises a number of CSI-RS ports. When the number of CSI-RS ports satisfies a rule, the CSI-RS density is set to 0.5 RE per RB per CSI-RS port. In an example, this value of the CSI-RS density can either be explicitly signaled or implicitly signaled. In another example, this value of the CSI-RS density can overwrite an existing value for the CSI-RS density. In some embodiments, the CSI-RS ports can be configured to ensure that the CSI-RS density is 0.5, which improves the CSI performance and reduces the system complexity.

In an example, the rule specifies the number of the CSI-RS ports is greater than 32. In another example, the rule specifies the number of the CSI-RS ports is greater than 48.

In yet another example, the rule specifies the number of the CSI-RS ports is equal to 32. In yet another example, the rule specifies the number of the CSI-RS ports is equal to 48. In yet another example, the rule specifies the number of the CSI-RS ports is equal to 64.

3. Example of a CSI-RS Configuration Comprising a Number of CSI-RS Ports

In some embodiments, the configuration of the CSI-RS includes a number of CSI-RS ports, and when the CSI-RS density is 0.5, the number indicates the type of CSI-RS resource that has a CSI-RS density of 0.5.

In some embodiments, the CSI-RS is carried by a CSI-RS resource and there are two types of CSI-RS resources with a density of 0.5. The first type of CSI-RS resource with a density of 0.5 is characterized by the position of the CSI-RS resource repeating on every two RBs across the configured frequency range of the CSI-RS resource, wherein the CSI-RS resource occupies only odd-indexed RBs or only even-indexed RBs. The second type of CSI-RS resource with a density of 0.5 is characterized by the position of the CSI-RS resource repeating on every two RBs across the configured frequency range of the CSI-RS resource, wherein the CSI-RS resource occupies both the odd-indexed RBs and the even-indexed RBs.

In response to the density of CSI-RS resources being 0.5, the number of CSI-RS ports indicates one of the two types of the CSI-RS resource. In an example, the number of CSI-RS ports being less than or equal to 32 indicates the first type of CSI-RS resources, and the number of CSI-RS ports being greater than 32 indicates the second type of CSI-RS resources. In another example, the number of CSI-RS ports being less than or equal to 48 indicates the first type of CSI-RS resources, and the number of CSI-RS ports being greater than 48 indicates the second type of CSI-RS resources.

4. Example of a CSI-RS Resource Being Made up of CDM Groups

In some embodiments, the CSI-RS is carried by a CSI-RS resource, which is made of code division multiplexing (CDM) groups, wherein a CDM group is a group of REs, which carry the CSI-RS of the CSI-RS ports using a code division multiplexing (CDM) technique.

Herein, the CSI-RS ports are mapped to the CDM groups according to the indexes of the CDM groups, and wherein the indexes of the CDM groups in odd-indexed RBs is not equal to the indexes of the CDM groups in even-indexed RBs. In an example, the CSI-RS ports are mapped to the CDM groups such that the index of the CSI-RS ports increases in the order of the increasing index of the CDM groups.

The indexes of the CDM groups in odd-indexed RBs not being equal to the indexes of the CDM groups in even-indexed RBs provides additional CDM group indexes, which enables the CSI-RS resource to be mapped to a greater number of CSI-RS ports, and the mapping capability of CSI-RS ports to the CSI-RS resources is improved.

In some embodiments, the indexes of the CDM groups in odd-indexed RBs are greater than indexes in even-indexed RBs. Herein, the CSI-RS ports are mapped to the CDM groups according to the indexes of the CDM groups, wherein the method of indexing the CDM groups impacts the indexing of the CSI-RS ports. The indexes of the CDM groups in odd-indexed RBs being greater than those in even-indexed RBs simplifies the indexing of the CSI-RS ports. Furthermore, when the CSI-RS resource indexing starts in an even-indexed RB, the method further simplifies the indexing the CSI-RS ports, resulting in the index of the CSI-RS starting in even-indexed RBs, which tracks with the CSI-RS resource indexing. This advantageously reduces the complexity of the system.

In an example, the indexes of the CDM groups in odd-indexed RBs are {4, 5, 6, 7} and the indexes of the CDM groups in even-indexed RBs is {0, 1, 2, 3}. In another example, the indexes of the CDM groups in odd-indexed RBs is {3, 4, 5} and the indexes of the CDM groups in even-indexed RBs is {0, 1, 2}. In yet another example, the indexes of the CDM groups in odd-indexed RBs is {4, 5, 6} and the indexes of the CDM groups in even-indexed RBs is {0, 1, 2, 3}. In yet another example, the indexes of the CDM groups in odd-indexed RBs is {3, 4} and the indexes of the CDM groups in even-indexed RBs is {0, 1, 2}.

In some embodiments, the number of CDM groups in even-indexed RBs is greater than the number of CDM groups in odd-indexed RBs.

In some embodiments, the number of CDM groups in even-indexed RBs is equal to the number of CDM groups in odd-indexed RBs.

In some embodiments, in response to the indexes of CDM groups in even-indexed RBs not being equal to the indexes of CDM groups in odd-indexed RBs, a single bitmap indicates the positions of the CDM groups in the odd-indexed RBs and the positions of the CDM groups in the even-indexed RBs. In an example, the indexes of the CDM groups in odd-indexed RBs are {3, 4, 5}, the indexes of the CDM groups in even-indexed RBs are {0, 1, 2}, and a set bit in the bitmap indicates both the positions of the CDM group 0 and the position of the CDM group 3.

In some embodiments, K0 bits in the bitmap indicate the positions of the CDM groups in even-indexed RBs, and the other bits in the bitmap indicates the positions of the CDM groups in odd-indexed RBs. Alternatively, K0 bits in the bitmap indicates the positions of the CDM groups in odd-indexed RBs, and the other bits in the bitmap indicates the positions of the CDM groups in even-indexed RBs, and wherein K0 is a positive integer.

In some embodiments, in response to the number of CDM groups in even-indexed RBs not being equal to the number of CDM groups in odd-indexed RBs, a first bitmap indicates the positions of the CDM groups in the odd-indexed RBs and a second bitmap indicates the positions of the CDM groups in the even-indexed RBs.

5. Example of a CSI-RS Report Comprising Port Coefficients

In some embodiments, the CSI report includes coefficients for CSI-RS ports in feedback from the wireless communication device (e.g., UE), wherein the coefficients are associated with a CSI-RS port set being mapped to two CSI-RS resources.

In an example, the CSI-RS ports mapped to a first CSI-RS resource are ports {0, 1, 2, 3}, the CSI-RS ports mapped to a second CSI-RS resource are ports {0, 1, 2, 3}. In this case, the CSI-RS port set mapped to the two CSI-RS resource includes ports {0, 1, 2, 3} mapped to the first CSI-RS resource and ports {0, 1, 2, 3} mapped to the second CSI-RS resource. The wireless communication device feeds back the coefficients of the ports that correspond to the port set mapped to the two resources.

In another example, the CSI-RS ports mapped to a first CSI-RS resource are ports {0, 1, 2, 3}, the CSI-RS ports mapped to a second CSI-RS resource are ports {4, 5, 6, 7}. In this case, the CSI-RS port set mapped to the two CSI-RS resource includes ports {0, 1, 2, 3, 4, 5, 6, 7}, which the wireless communication device feeds back in the CSI report. These coefficients of the ports correspond to the port set mapped to the two resources.

In some embodiments, the CSI report includes a subset from the CSI-RS port set in the previous embodiment for each multiple-input multiple-output (MIMO) layer, as well as the coefficients corresponding to the ports in the subset of the CSI-RS port set.

In an example, the CSI-RS port set (S) is mapped to two CSI-RS resources, and the wireless communication device feeds back a subset U from the CSI-RS port set S. Therein, the wireless communication device indicates (i) a first CSI-RS port group from the subset for a first MIMO layer, the coefficients of which are fed back, and (ii) a second CSI-RS port group from the subset for a second MIMO layer, the coefficients of which are also fed back. Thus, the CSI-RS ports for each MIMO layer are aggregated to the subset U, resulting in a reduced number of CSI-RS ports to be calculated, while still maintaining the ability for specific CSI-RS ports for each MIMO layer to be selected to improve the CSI performance.

6. Example of a CSI-RS Report Comprising a Vector Pair—CSI-RS Port Mapping

In some embodiments, the CSI report comprises a precoding matrix indicator (PMI), wherein the precoding matrix associated with the PMI includes combination of vector pairs that are mapped to CSI-RS ports. Herein, the configuration of the CSI-RS or the configuration of the CSI report comprises a number of the vector pairs, and the configuration of the CSI-RS comprises a number of the CSI-RS ports.

In an example, the vector pair comprises a spatial vector and a frequency vector. In another example, the vector pair comprises a beam vector and a delay vector.

In some embodiments, in response to the number of the vector pairs being smaller than or equal to the number of the CSI-RS ports, the vector pairs are mapped to a single CSI-RS resource. In other embodiments, in response to the number of the vector pairs being greater than the number of the CSI-RS ports, one part of the vector pair is mapped to a first CSI-RS resource, and the other part of the vector pair is mapped to a second CSI-RS resource.

In an example, the vector pairs are divided into two groups of vector pairs; one group of vector pairs is mapped to a first resource and the other group of vector pairs are mapped to a second CSI-RS resource.

In another example, the number of vector pairs is smaller than or equal to the number of the CSI-RS ports mapped to the CSI-RS resource, and the vector pairs are mapped to a CSI-RS resource. In this case, the number of vector pairs could be 24 and the number of CSI-RS ports (which could be mapped to the CSI-RS resource) could be 32.

In yet another example, the number of vector pairs is larger than the number of the CSI-RS ports mapped to the CSI-RS resource. Herein, the vector pairs are mapped to two CSI-RS resources, wherein a set of the vector pairs are mapped to a CSI-RS resource, and the remaining vector pairs are mapped to another CSI-RS resource. In this case, the number of vector pairs could be 64 and the number of CSI-RS ports (which could be mapped to the CSI-RS resource) could be 32.

In some embodiments, the vector pairs are divided into two groups, with the first group comprising P1 vector pairs and the second group comprising P2 vector pairs. Herein, the first group of vector pairs is mapped to a first CSI-RS resource and the second group of vector pairs is mapped to a second CSI-RS resource in at least one of following methods:
(1) When the first CSI-RS resource belongs to a first CSI-RS resource set and the second CSI-RS resource belongs to a second CSI-RS resource set, the first CSI-RS resource has the same position in the first CSI-RS resource set as the second CSI-RS resource has in the second CSI-RS resource set; and
(2) When the first CSI-RS resource and the second CSI-RS resource belong to the same CSI-RS resource set, the difference between the position of the first CSI-RS resource and the position of the second CSI-RS resource is K, which equals half of the number of CSI-RS resources in the CSI-RS resource set.

In some embodiments, a parameter is defined in the configuration of the CSI-RS to indicate whether there are two CSI-RS resource in the CSI-RS resource set that can be used to map the two group vector pairs.

In some embodiments, in response to P1 not being equal to P2, the first group of vector pairs are mapped to a first CSI-RS resource and the second group of vector pairs are mapped to a second CSI-RS resource using method (1) described above. Alternatively, in response to P1 being equal to P2, the first group of vector pairs are mapped to a first CSI-RS resource and the second group of vector pairs are mapped to a second CSI-RS resource using method (2) described above.

7. Example of a CSI-RS Report Comprising a (CSI-RS Port, Frequency) Vector

In some embodiments, the CSI report comprises a precoding matrix indicator (PMI), wherein a precoding matrix associated with the PMI includes a combination of vector pairs, with one vector of the vector pair being a CSI-RS port vector and the other vector of the vector pair being a frequency vector. Herein, the configuration of the CSI-RS or the configuration of CSI comprises an indication for a group of CSI-RS ports and the indexes of the frequency vectors matching the group of CSI-RS ports. A vector pair includes a CSI-RS port vector and a mapped frequency vector based on the indication.

In an example, the configuration comprises an indication for a group of CSI-RS ports, $\{0, 1, 2, 3\}$, and indexes of the frequency vectors matching the group of CSI-RS ports, $\{-1, 0, 1\}$.

A port vector corresponding to one of the ports $\{0, 1, 2, 3\}$ and a frequency vector corresponding to one of the frequencies $\{-1, 0, 1\}$ can form a vector pair for the precoding matrix combination. The configuration can include an indication of the vector pair range, which can reduce system complexity, while improving the CSI performance.

In some embodiments, the indexes of the frequency vectors matching the group of CSI-RS ports are selected from a set of symmetrical indexes with a center zero-valued element.

In an example, the symmetrical indexes are $\{-1, 0, 1\}$.

In another example, the symmetrical indexes are $\{-2, 1, 0, 1, 2\}$.

8. Example of a CSI-RS Report Comprising Feedback Including an Indication

In some embodiments, the CSI report includes an indication for two CSI-RS resources in feedback from the wireless communication device, and wherein the fed back CSI comes from the two CSI-RS resources.

In some embodiments, a first CSI-RS resource of the two CSI-RS resources belongs to a first CSI-RS resource set and a second CSI-RS resource of the two CSI-RS resources belongs to a second CSI-RS resource set. Herein, the first CSI-RS resource has the same position in the first CSI-RS resource set as the second CSI-RS resource has in the second CSI-RS resource set. In an example, a single indication can be used to indicate this relationship.

In some embodiments, in response to the two CSI-RS resources belonging to the same CSI-RS resource set, the two CSI-RS resources have neighboring positions. In an example, the position of the first CSI-RS resource is n and the position of the second CSI-RS resource is n+1, wherein n is a non-negative integer. In another example, the position of the first CSI-RS resource is 2m and the position of the second CSI-RS resource is 2m+1, wherein m is a non-negative integer.

In some embodiments, in response to the two CSI-RS resources belonging to the same CSI-RS resource set, a difference between the positions of the two CSI-RS resources in the CSI-RS resource set is determined based on the number of the CSI-RS resources in the CSI-RS resource set.

In an example, the two CSI-RS resources belong to the same CSI-RS resource set that has 2K CSI-RS resources. The difference of the two CSI-RS resource positions in the CSI-RS resource set is K, which is half of the number of the CSI-RS resources in the CSI-RS resource set. Herein, K is a positive integer.

In some embodiments, the CSI-RS report includes an indication of CSI-RS ports, the coefficients of which are fed back, from the wireless communication device, from the two resources.

9. Example of a CSI-RS Report Comprising a Precoding Matrix Granularity

In some embodiments, the CSI report includes a precoding matrix indicator (PMI) and a precoding matrix granularity in frequency, which is based on the CSI-RS density.

In some embodiments, in response to the CSI-RS density value being p REs per RBs per CSI-RS port, the PMI indicates 1 precoding matrix for each 1/p RBs, where p is a positive number. In an example, in response to the CSI-RS density value being 1 REs per RBs per CSI-RS port, the PMI indicates 1 precoding matrix for each of the 1 RBs. In another example, in response to the CSI-RS density value being 0.5 REs per RBs per CSI-RS port, the PMI indicates 1 precoding matrix for each of the 2 RBs.

10. Example of a CSI-RS Report Comprising Vectors Mapped to a CSI-RS

In some embodiments, the CSI report comprises a precoding matrix indicator (PMI), wherein a precoding matrix associated with the PMI includes a combination of vectors, which are determined according to indexes of the vectors, and are mapped into the CSI-RS in at least one of the techniques (1)-(6) described below.

In these embodiments, $v_l$ is a vector with an index of l, where l determines $v_l$. In this example, $v_l$ has only one "1"-valued element with the other elements being 0, and the index of l determines the index of the "1"-valued element in the vector.

In an example, for the vector $v_0=[1\ 0\ 0\ 0]^T$, the index of the "1"-valued element is 0. In another example, for the vector $v_1=[0\ 1\ 0\ 0]^T$, the index of the "1"-valued element of 1. In these examples, the indexing of the elements starts from 0.

Alternatively, the index of the "1"-valued element in the vector $v_l$ can be l+1 when the indexing of the elements starts from 1. In an example, for the vector $v_0=[1\ 0\ 0\ 0]^T$, the index of the "1"-valued element is 1. In another example, for the vector $v_1=[0\ 1\ 0\ 0]^T$, the index of the "1"-valued element is 2.

In some embodiments, $v_l$ only has K "1"-valued elements based on a pattern with the other elements being zero-valued. Herein, the index l corresponds to the index of the first "1"-valued element in the vector. In an example, for the vector $v_0=[1\ 0\ 0\ 0\ 1\ 0\ 0\ 0]^T$, the index of the first "1"-valued element is 0. In another example, for the vector $v_1=[0\ 1\ 0\ 0\ 0\ 1\ 0\ 0]^T$, the index of the first "1"-valued element is 1. In these examples, the indexing of the elements starts from 0.

Alternatively, the index of the "1"-valued element in the vector can be +1 when the indexing of the elements starts from 1. In an example, for the vector $v_0=[1\ 0\ 0\ 0\ 1\ 0\ 0\ 0]^T$, the index of the first "1"-valued element is 1. In another example, for the vector $v_1=[0\ 1\ 0\ 0\ 0\ 1\ 0\ 0]^T$, the index of the first "1"-valued element is 2.

Technique 1

In some embodiments, the index of the vector is based on the index of the frequency unit, which the vector is mapped to, in the CSI-RS resource. In an example, the index of the vector is incremented by 1 and the index of the frequency unit is incremented by 1. In another example, the index of the vector is incremented by N and the index of the frequency unit is incremented by 1, where N is a positive integer.

In some embodiments, the frequency unit is a RB group.

In some embodiments, the RBs in the RB group are continuous. In an example, {RB(n), RB(n+1), RB(n+2), RB(n+3)} are continuous, where {n, n+1, n+2, n+3} are indexes of the RBs, wherein n is an integer. In another example, {RB(n), RB(n+1)} is a valid RB group.

In some embodiments, the RBs in the RB group are uniformly spaced within the RB group. In an example, {RB(n), RB(n+X), RB(n+2X), RB(n+3X)} are uniformly spaced RBs, where {n, n+X, n+2X, n+3X} are the indexes of the RBs, wherein n and X are integers. In another example, {RB(n), RB(n+X)} is a valid RB group.

In some embodiments, the RB group is made up of sub RB groups, where the sub RB groups are uniformly spaced and the RBs within a sub RB group are continuous. In an example,

| { | RB(n),RB(n+1), RB(n+2),RB(n+3), |
|---|---|
|  | RB(n+X), RB(n+1+X), RB(n+2+X),RB(n+3+X), |
|  | RB(n+2X), RB(n+1+2X), RB(n+2+2X),RB(n+3+2X), |
|  | RB(n+3X), RB(n+1+3X), RB(n+2+3X),RB(n+3+3X) } | is a valid RB group, wherein {RB(n), RB(n+1), RB(n+2), RB(n+3)} is the sub RB group.

In another example, {RB(n), RB(n+1), RB(n+X), RB(n+1+X)} is a valid RB group, wherein {RB(n), RB(n+1)} is the sub RB group.

Technique 2

In some embodiments, the index of the vector is based on the index of the CSI-RS port, which the vector is mapped to, in the CSI-RS resource.

In an example, the index of the vector is incremented by 1 and the index of the CSI-RS port is incremented by 1. In another example, the index of the vector is incremented N and the index of the CSI-RS port is incremented 1, wherein N is a positive integer. In these examples, N is the number of the frequency units.

Technique 3

In some embodiments, the index of the vector is based on one or more parameters of the CSI-RS resource, which the vector is mapped to. Examples of the one or more parameters include an index of the CSI-RS resource, a position in the CSI-RS resource set, a frequency position of the CSI-RS resource, and the density of the CSI-RS resource.

Technique 4

In some embodiments, the index of the vector is based on a combination of an index of the CSI-RS port and an index of the CSI-RS resource, which the vector is mapped to.

In an example, the index of the vector is incremented by 1 and the index of the CSI-RS port is incremented by 1. In another example, the index of the vector is incremented by N and the index of the CSI-RS resource is incremented by 1, wherein N is a integer. In yet another example, the index of the vector is incremented by 1 and the index of the CSI-RS resource is incremented by 1. In yet another example, the index of the vector is incremented by N and the index of the CSI-RS port is incremented by 1, wherein N is a integer.

Technique 5

In some embodiments, the index of the vector is based on a combination of an index of the CSI-RS port and an index of the frequency unit, which the vector is mapped to.

In an example, the index of the vector is incremented by 1 and the index of the CSI-RS port is incremented by 1. In another example, the index of the vector is incremented by N and the index of the frequency unit is incremented by 1, wherein N is the number of the CSI-RS ports. In yet another example, the index of the vector is incremented by 1 and the index of the frequency unit is incremented by 1. In yet another example, the index of the vector is incremented by N and the index of the CSI-RS port is incremented by 1, wherein N is the number of the frequency units.

Technique 6

In some embodiments, the index of the vector is based on a combination of an index of the CSI-RS port, an index of the frequency unit, and an index of the CSI-RS resource that the vector is mapped to.

In an example, the index of the vector is incremented by 1 and the index of the CSI-RS port is incremented by 1; the index of the vector is incremented by N and the index of the frequency unit is incremented by 1; the index of the vector is incremented by M and the index of the CSI-RS resource is incremented by 1, wherein N and M are integers.

In another example, the index of the vector is incremented by 1 and the index of the frequency unit is incremented by 1; the index of the vector is incremented by N and the index of the CSI-RS port is incremented by 1; the index of the vector is incremented by M and the index of the CSI-RS resource is incremented by 1, wherein N and M are integers.

In yet another example, the index of the vector is incremented by M and the index of the CSI-RS resource is incremented by 1; the index of the vector is incremented by N and the index of the frequency unit is incremented by 1; the index of the vector is incremented by M and the index of the CSI-RS port is incremented by 1, wherein N and M are integers.

11. Example of a CSI-RS Report Comprising Vectors Mapped to a CSI-RS Resource In some embodiments, the CSI report comprises a precoding matrix indicator (PMI), wherein the precoding matrix associated with the PMI includes a combination of vectors, which are mapped to the CSI-RS resource. The set bits of a bitmap provides an indication for the vectors, mapped to the CSI-RS, being used in the precoding matrix, where a correspondence between the index of the bit of the bitmap and the CSI-RS is based on at least one of the techniques (1)-(6) described below.

Technique 1

In some embodiments, the index of the bit of the bitmap is based on the index of the frequency unit, which the vector is mapped to, in the CSI-RS resource. In an example, the index of the bit of the bitmap is incremented by 1 and the index of the frequency unit is incremented by 1. In another example, the index of the bit of the bitmap is incremented by N and the index of the frequency unit is incremented by 1, where N is a positive integer.

In some embodiments, the frequency unit is a RB group.

In some embodiments, the RBs in the RB group are continuous. In an example, {RB(n), RB(n+1), RB(n+2), RB(n+3)} are continuous, where {n, n+1, n+2, n+3} are indexes of the RBs, wherein n is an integer. In another example, {RB(n), RB(n+1)} is a valid RB group.

In some embodiments, the RBs in the RB group are uniformly spaced within the RB group. In an example, {RB(n), RB(n+X), RB(n+2X), RB(n+3X)} are uniformly spaced RBs, where {n, n+X, n+2X, n+3X} are the indexes of the RBs, wherein n and X are integers. In another example, {RB(n), RB(n+X)} is a valid RB group.

In some embodiments, the RB group is made up of sub RB groups, where the sub RB groups are uniformly spaced and the RBs within a sub RB group are continuous. In an example, { RB(n),RB(n+1), RB(n+2),RB(n+3),
RB(n+X), RB(n+1+X), RB(n+2+X),RB(n+3+X), -continued RB(n+2X), RB(n+1+2X), RB(n+2+2X),RB(n+3+2X),
RB(n+3X), RB(n+1+3X), RB(n+2+3X),RB(n+3+3X) } is a valid RB group, wherein {RB(n), RB(n+1), RB(n+2), RB(n+3)} is the sub RB group.

In another example, RB(n), RB(n+1), RB(n+X), RB(n+1+X) is a valid RB group, wherein {RB(n), RB(n+1)} is the sub RB group.

Technique 2

In some embodiments, the index of the bit of the bitmap is based on the index of the CSI-RS port, which the vector is mapped to, in the CSI-RS resource.

In an example, the index of the bit of the bitmap is incremented by 1 and the index of the CSI-RS port is incremented by 1. In another example, the index of the bit of the bitmap is incremented N and the index of the CSI-RS port is incremented 1, wherein N is a positive integer. In these examples, N is the number of the frequency units.

Technique 3

In some embodiments, the index of the bit of the bitmap is based on one or more parameters of the CSI-RS resource, which the vector is mapped to. Examples of the one or more parameters include an index of the CSI-RS resource, a position in the CSI-RS resource set, a frequency position of the CSI-RS resource, and the density of the CSI-RS resource.

Technique 4

In some embodiments, the index of the bit of the bitmap is based on a combination of an index of the CSI-RS port and an index of the CSI-RS resource, which the vector is mapped to.

In an example, the index of the bit of the bitmap is incremented by 1 and the index of the CSI-RS port is incremented by 1. In another example, the index of the bit of the bitmap is incremented by N and the index of the CSI-RS resource is incremented by 1, wherein N is a integer. In yet another example, the index of the bit of the bitmap is incremented by 1 and the index of the CSI-RS resource is incremented by 1. In yet another example, the index of the bit of the bitmap is incremented by N and the index of the CSI-RS port is incremented by 1, wherein N is a integer.

Technique 5

In some embodiments, the index of the bit of the bitmap is based on a combination of an index of the CSI-RS port and an index of the frequency unit, which the vector is mapped to.

In an example, the index of the bit of the bitmap is incremented by 1 and the index of the CSI-RS port is incremented by 1. In another example, the index of the bit of the bitmap is incremented by N and the index of the frequency unit is incremented by 1, wherein N is the number of the CSI-RS ports. In yet another example, the index of the bit of the bitmap is incremented by 1 and the index of the frequency unit is incremented by 1. In yet another example, the index of the bit of the bitmap is incremented by N and the index of the CSI-RS port is incremented by 1, wherein N is the number of the frequency units.

In some embodiments, a length of the bitmap is a product of the number of the CSI-RS ports and the number of the frequency units, or multiple of the product. The length of a bitmap is the number of the bits in the bitmap. In an example, the length of the bitmap [1010] is 4 since there are 4 bits in the bitmap.

Technique 6

In some embodiments, the index of the bit of the bitmap is based on a combination of an index of the CSI-RS port, an index of the frequency unit, and an index of the CSI-RS resource that the vector is mapped to. In the following examples, M is the number of the CSI-RS ports, N is the number of the frequency units, and the length of the bitmap is the product of M and N, or a multiple of the product.

In an example, the index of the bit of the bitmap is incremented by 1 and the index of the CSI-RS port is incremented by 1; the index of the bit of the bitmap is incremented by N and the index of the frequency unit is incremented by 1; the index of the bit of the bitmap is incremented by M and the index of the CSI-RS resource is incremented by 1, wherein N and M are integers.

In another example, the index of the bit of the bitmap is incremented by 1 and the index of the frequency unit is incremented by 1; the index of the bit of the bitmap is incremented by N and the index of the CSI-RS port is incremented by 1; the index of the bit of the bitmap is incremented by M and the index of the CSI-RS resource is incremented by 1, wherein N and M are integers.

In yet another example, the index of the bit of the bitmap is incremented by M and the index of the CSI-RS resource is incremented by 1; the index of the bit of the bitmap is incremented by N and the index of the frequency unit is incremented by 1; the index of the bit of the bitmap is incremented by M and the index of the CSI-RS port is incremented by 1, wherein N and M are integers.

12. Example of a CSI-RS report Comprising a Combination of Vectors

In some embodiments, the CSI report comprises a precoding matrix indicator (PMI) that includes a combination of vectors, wherein each vector includes at least one of the following features:
  (1) All the elements of the vector are "1"-valued; and
  (2) M continuous elements of the vector are "1"-valued and the other elements are zero-valued.

In an example, (1) includes the vectors $[1, 1, 1, 1]^T$ and $[1, 1, 1, 1, 1, 1, 1, 1]^T$ In another example, (2) includes the following vectors:
$[1, 1, 0, 0]^T$,
$[0, 0, 0, 0, 1, 1, 1, 1]^T$, and
$[0, 0, 1, 1, 1, 1, 0, 0]^T$.

In some embodiments, each element of the vector corresponds to a frequency unit, and the configuration includes the number of vectors included in the precoding matrix associated with the PMI. When the number of vectors is 1, all the elements of the vector are "1"-valued (e.g., feature (1)), and when the number of vectors is greater than one, then the vectors are constructed based on feature (2).

In one example case, a "1"-valued element is in the first position in the first vector in the precoding matrix. In this case, example vectors include $[1, 1, 1, 1]^T$ and $[1, 1, 0, 0]^T$.

In another example case, the first "1"-valued element in a second vector is located next to a last (or final) "1"-valued element of a first vector. In this case, an example pair of vectors include a first vector being $[1, 1, 0, 0]^T$ and a second vector being $[0, 0, 1, 1]^T$. Another example pair of vectors include a first vector being $[1, 1, 1, 0, 0, 0, 0, 0]^T$ and a second vector being $[0, 0, 0, 1, 1, 1, 0, 0]^T$.

In some embodiments, the position of the last (or final) "1"-valued element is reported in the CSI report. In an example, for the vector $[1, 1, 0, 0,]^T$, the index of the last "1"-valued element is 1, which is reported. In another example, for the vector $[1, 1, 1, 0, 0, 0, 0, 0]^T$, the index of the last "1"-valued element is 2, which is reported.

13. Another Example of a CSI-RS Report Comprising a Combination of Vectors

In some embodiments, the CSI report comprises a precoding matrix indicator (PMI) that includes a combination of vectors, wherein each vector includes at least one of the following features:
  (1) All the elements of the vector are "1"-valued; and
  (2) The "1"-valued elements in the vector are uniformly distributed and the other elements are zero-valued.

In an example, $[1, 0, 0, 1, 0, 0, 1, 0, 0]^T$
In another example, $[0, 1, 0, 0, 1, 0, 0, 1, 0]^T$
In yet another example, $[0, 0, 1, 0, 0, 1, 0, 0, 1]^T$ In some embodiments, the CSI report comprises a bitmap, wherein each set bit of the bitmap is indicative of a corresponding vector in the precoding matrix, and wherein an index of the set bit in the bitmap indicates the position of the first "1"-valued element in the corresponding vector.

In an example, an index of 0 for the bitmap [100] indicates that the first "1"-valued element in the corresponding vector is at index 0, i.e., $[1, 0, 0, 1, 0, 0, 1, 0, 0]^T$ In another example, an index of 1 for the bitmap [010] indicates that the first "1"-valued element in the corresponding vector is at index 1, i.e., $[0, 1, 0, 0, 1, 0, 0, 1, 0]^T$ In yet another example, an index of 2 for the bitmap [001] indicates that the first "1"-valued element in the corresponding vector is at index 2, i.e., $[0, 0, 1, 0, 0, 1, 0, 0, 1]^T$ In some embodiments, the CSI report comprises a bitmap, wherein each set bit of the bitmap is indicative of a vector pair in the precoding matrix. Herein, one vector of the vector pair is a CSI-RS port mapped vector, the other vector of the vector pair is a frequency unit mapped vector, and the mapping between the bitmap and the vector pair includes at least one of the following:
  (1) The bit index of the bitmap corresponding to the index of the CSI-RS port mapped vector is incremented by 1, and the bit index of the bitmap corresponding to the index of the frequency unit mapped vector is incremented by P, wherein P is the number of the CSI-RS port mapped vectors; and
  (2) the bit index of the bitmap corresponding to the index of the frequency unit mapped vector is incremented by 1, and the bit index of the bitmap corresponding to the index of the CSI-RS port mapped vector is incremented by M, wherein M is the number of frequency unit mapped vectors.

14. Example Implementations and Methods of the Disclosed Technology

Figure 2:
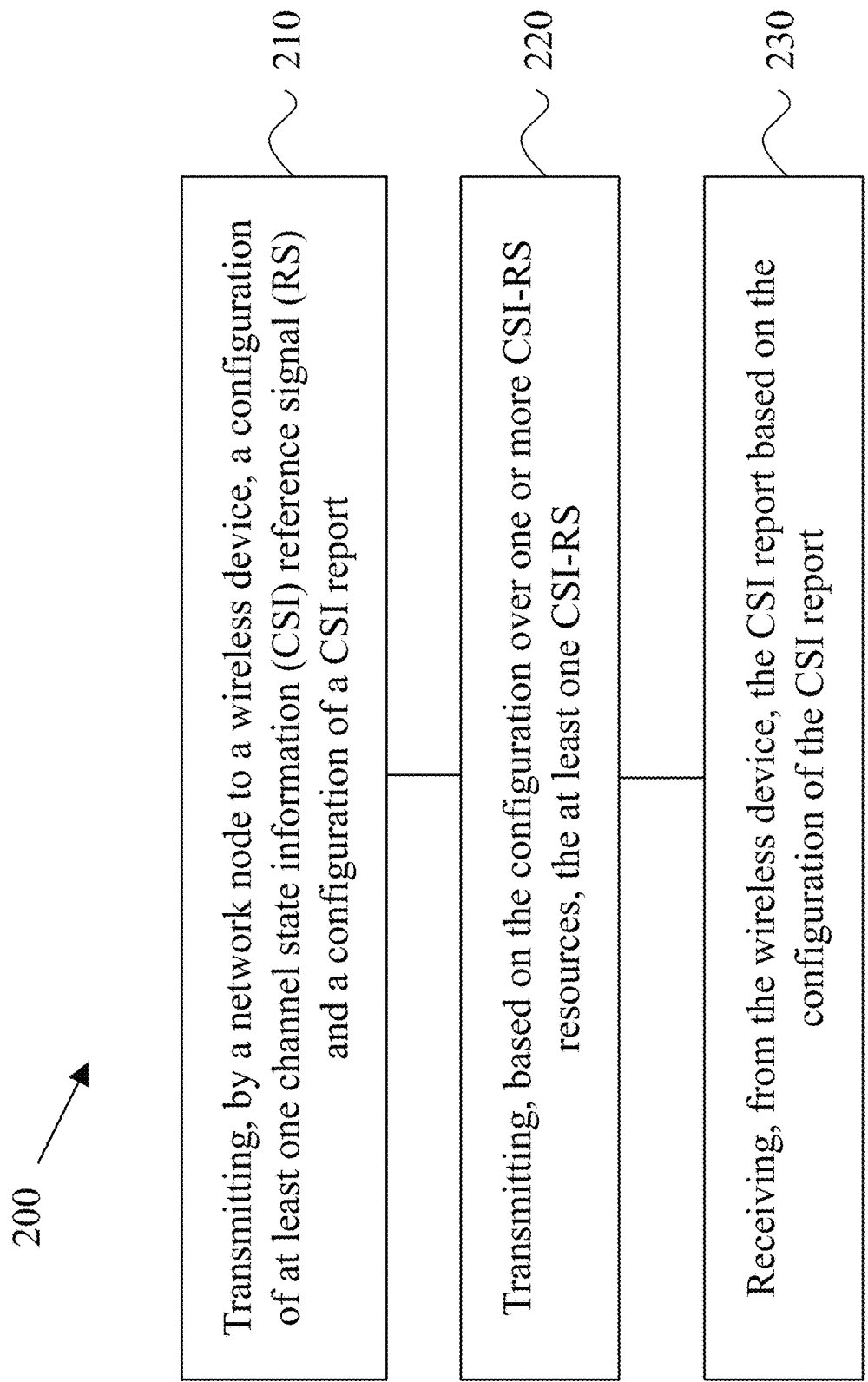
FIG. 2 shows an example of a wireless communication method, in accordance with some embodiments of the presently disclosed technology.

FIG. 2 shows an example of a wireless communication method 200 for configuring channel state information (CSI) reference signals (RS). The method 200 includes, at operation 210, transmitting, by a network node to a wireless device, a configuration of at least one channel state information (CSI) reference signal (RS) and a configuration of a CSI report.

The method 200 includes, at operation 220, transmitting, based on the configuration over one or more CSI-RS resources, the at least one CSI-RS.

The method 200 includes, at operation 230, receiving, from the wireless device, the CSI report based on the configuration of the CSI report.

Figure 3:
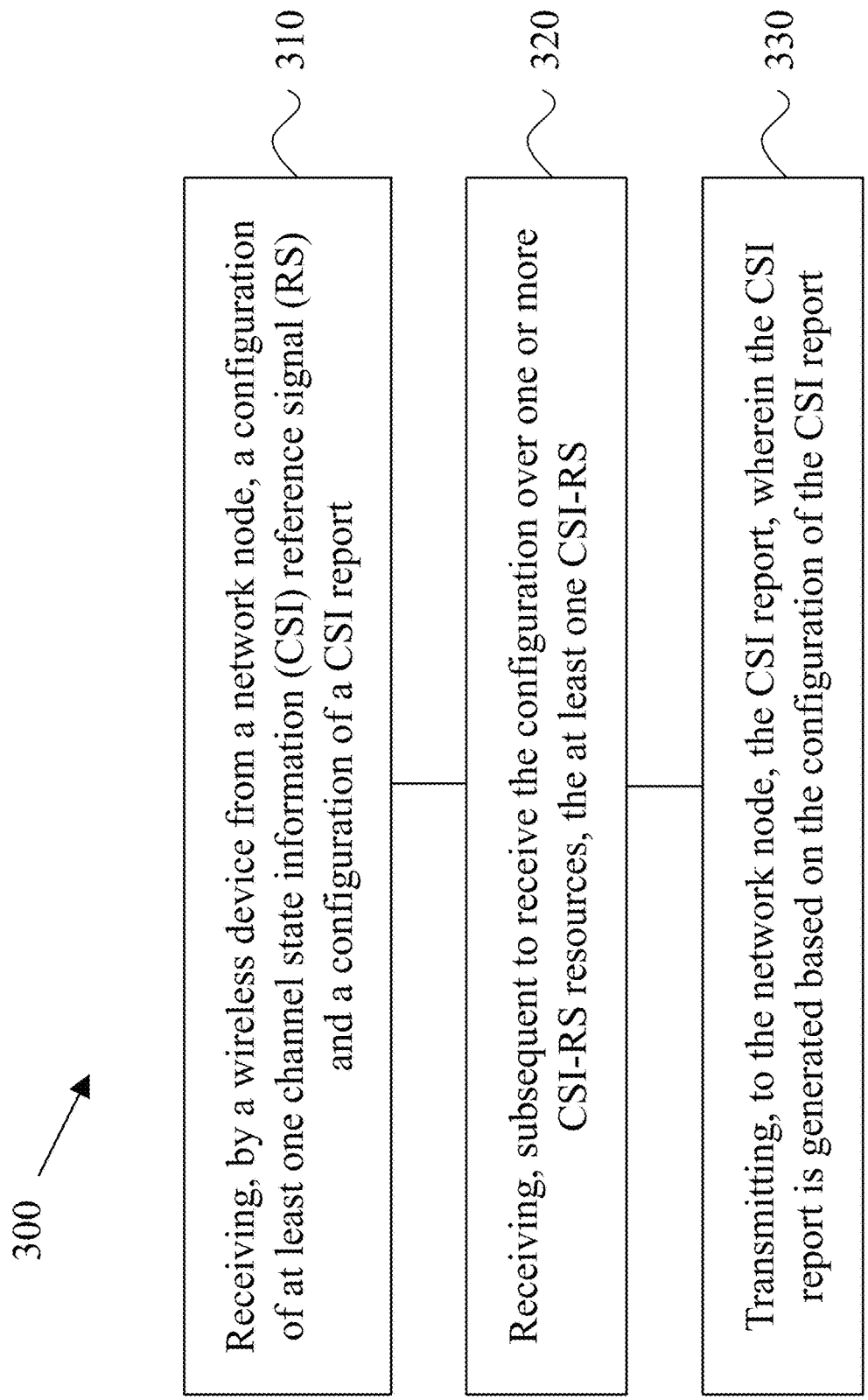
FIG. 3 shows another example of a wireless communication method, in accordance with some embodiments of the presently disclosed technology.

FIG. 3 shows an example of a wireless communication method 300 for configuring channel state information (CSI) reference signals (RS). The method 300 includes, at operation 310, receiving, by a wireless device from a network node, a configuration of at least one channel state information (CSI) reference signal (RS) and a configuration of a CSI report.

The method 300 includes, at operation 320, receiving, subsequent to receive the configuration over one or more CSI-RS resources, the at least one CSI-RS.

The method 300 includes, at operation 330, transmitting, to the network node, the CSI report, wherein the CSI report is generated based on the configuration of the CSI report.

Embodiments of the disclosed technology provide the following technical solutions for the configuration of channel state information (CSI) reference signals (RS), which reduce the complexity of wireless communication systems.

S1. A method of wireless communication, comprising transmitting, by a network node to a wireless device, a configuration of at least one channel state information (CSI) reference signal (RS) and a configuration of a CSI report; transmitting, based on the configuration over one or more CSI-RS resources, the at least one CSI-RS; and receiving, from the wireless device, the CSI report based on the configuration of the CSI report.

S2. A method of wireless communication, comprising receiving, by a wireless device from a network node, a configuration of at least one channel state information (CSI) reference signal (RS) and a configuration of a CSI report; receiving, subsequent to receive the configuration over one or more CSI-RS resources, the at least one CSI-RS; and transmitting, to the network node, the CSI report, wherein the CSI report is generated based on the configuration of the CSI report.

S3. The method of solution S1 or S2, wherein the configuration of the at least one CSI-RS comprises a number of CSI-RS ports associated with the at least one CSI-RS.

S4. The method of solution S3, wherein the number of CSI-RS ports is greater than a threshold.

S5. The method of solution S3, wherein the number of CSI-RS ports is equal to a threshold.

S6. The method of solution S3, wherein the number of CSI-RS ports is indicative of a type of the one or more CSI-RS resources.

S7. The method of any of solutions S4 to S6, wherein the one or more CSI-RS resources comprise 0.5 resource elements per resource block per CSI-RS port.

S8. The method of solution S3, wherein the one or more CSI-RS resources are partitioned into code division multiplexing (CDM) groups, and wherein the number of CSI-RS ports are mapped to the CDM groups based on indexes of the CDM groups.

S9. The method of solution S8, wherein an index of the CDM group in an odd-numbered resource block is not equal to an index of the CDM group in an even-numbered resource block.

S10. The method of solution S8, wherein a number of the CDM groups in even-numbered resource blocks is greater than a number of the CDM groups in odd-numbered resource blocks.

S11. The method of solution S8, wherein a number of the CDM groups in even-numbered resource blocks is equal to a number of the CDM groups in odd-numbered resource blocks.

S12. The method of solution S8, wherein a single bitmap comprises one or more indications for positions of the CDM groups in even-numbered resource blocks and positions of the CDM groups in odd-numbered resource blocks.

S13. The method of solution S12, wherein the single bitmap comprises N bits, wherein K0 bits indicate the positions of the CDM groups in the even-numbered resource blocks and (N—K0) bits indicate the positions of the CDM groups in the odd-numbered resource blocks, wherein K0 and N are positive integers, and wherein K0<N.

S14. The method of solution S8, wherein a first bitmap comprises one or more indications for positions of the CDM groups in even-numbered resource blocks and a second bitmap comprises one or more indications for positions of the CDM groups in odd-numbered resource blocks.

S15. A method of wireless communication, comprising transmitting, by a network node to a wireless device, a configuration of at least one channel state information (CSI) reference signal (RS) and a configuration of a CSI report; transmitting, based on the configuration over one or more CSI-RS resources, the at least one CSI-RS, wherein a set of CSI-RS ports associated with the at least one CSI-RS are mapped to two CSI-RS resources of the one or more CSI-RS resources, and wherein the CSI report comprises coefficients associated with the set of CSI-RS ports; and receiving, from the wireless device, the CSI report based on the configuration of the CSI report.

S16. A method of wireless communication, comprising receiving, by a wireless device from a network node, a configuration of at least one channel state information (CSI) reference signal (RS) and a configuration of a CSI report; receiving, subsequent to receive the configuration over one or more CSI-RS resources, the at least one CSI-RS, wherein a set of CSI-RS ports associated with the at least one CSI-RS are mapped to two CSI-RS resources of the one or more CSI-RS resources, and wherein the CSI report comprises coefficients associated with the set of CSI-RS ports; and transmitting, to the network node, the CSI report, wherein the CSI report is generated based on the configuration of the CSI report.

S17. The method of solution S15 or S16, wherein the CSI report comprises a subset of CSI-RS ports from the set of CSI-RS ports, wherein at least one CSI-RS port is selected from the subset of CSI-RS ports for each multiple-input multiple-output (MIMO) layer, and wherein the coefficients of the at least one CSI-RS port are specified for the each MIMO layer.

S18. A method of wireless communication, comprising transmitting, by a network node to a wireless device, a configuration of at least one channel state information (CSI) reference signal (RS) and a configuration of a CSI report; transmitting, based on the configuration over one or more CSI-RS resources, the at least one CSI-RS; and receiving, from the wireless device, the CSI report based on the configuration of the CSI report, wherein the CSI report comprises a precoding matrix indicator (PMI), wherein a precoding matrix associated with the PMI comprises a plurality of vector pairs that are mapped to a set of CSI-RS ports associated with the at least one CSI-RS.

S19. A method of wireless communication, comprising receiving, by a wireless device from a network node, a configuration of at least one channel state information (CSI) reference signal (RS) and a configuration of a CSI report; receiving, subsequent to receive the configuration over one or more CSI-RS resources, the at least one CSI-RS; and transmitting, to the network node, the CSI report, wherein the CSI report is generated based on the configuration of the CSI report, wherein the CSI report comprises a precoding matrix indicator (PMI), wherein a precoding matrix associated with the PMI comprises a plurality of vector pairs that are mapped to a set of CSI-RS ports associated with the at least one CSI-RS.

S20. The method of solution S18 or S19, wherein the configuration of the at least one CSI-RS or the configuration of the CSI report comprises a number of the plurality of vector pairs, and wherein the configuration of the at least one CSI-RS comprises a number of the set of CSI-RS ports.

S21. The method of solution S20, wherein the plurality of vector pairs is mapped to a CSI-RS resource of the one or more CSI-RS resources in response to the number of the plurality of vector pairs being less than or equal to the number of the set of CSI-RS ports.

S22. The method of solution S20, wherein a first group of the plurality of vector pairs is mapped to a first CSI-RS resource of the one or more CSI-RS resources and a second group of the plurality of vector pairs is mapped to a second CSI-RS resource of the one or more CSI-RS resources in response to the number of the plurality of vector pairs being greater than the number of the set of CSI-RS ports.

S23. A method of wireless communication, comprising transmitting, by a network node to a wireless device, a configuration of at least one channel state information (CSI) reference signal (RS) and a configuration of a CSI report; transmitting, based on the configuration over one or more CSI-RS resources, the at least one CSI-RS; and receiving, from the wireless device, the CSI report based on the configuration of the CSI report, wherein the CSI report comprises a precoding matrix indicator (PMI), wherein a precoding matrix associated with the PMI comprises a plurality of vector pairs, and wherein each of the plurality of vector pairs comprises a frequency vector and a CSI-RS port vector.

S24. A method of wireless communication, comprising receiving, by a wireless device from a network node, a configuration of at least one channel state information (CSI) reference signal (RS) and a configuration of a CSI report; receiving, subsequent to receive the configuration over one or more CSI-RS resources, the at least one CSI-RS; and transmitting, to the network node, the CSI report, wherein the CSI report is generated based on the configuration of the CSI report, wherein the CSI report comprises a precoding matrix indicator (PMI), wherein a precoding matrix associated with the PMI comprises a plurality of vector pairs, and wherein each of the plurality of vector pairs comprises a frequency vector and a CSI-RS port vector.

S25. The method of solution S23 or S24, wherein the configuration of the at least one CSI-RS or the configuration of the CSI report comprises an indication of a group of CSI-RS ports and indexes of frequency vectors matching the group of CSI-RS ports.

S26. The method of solution S25, wherein the indexes of the frequency vectors are symmetric indexes around a zero value.

S27. A method of wireless communication, comprising transmitting, by a network node to a wireless device, a configuration of at least one channel state information (CSI) reference signal (RS) and a configuration of a CSI report; transmitting, based on the configuration over one or more CSI-RS resources, the at least one CSI-RS; and receiving, from the wireless device, the CSI report based on the configuration of the CSI report, wherein the CSI report comprises CSI feedback and an indication of two CSI-RS resources of the one or more CSI-RS resources, and wherein the CSI feedback is based on the two CSI-RS resources.

S28. A method of wireless communication, comprising receiving, by a wireless device from a network node, a configuration of at least one channel state information (CSI) reference signal (RS) and a configuration of a CSI report; receiving, subsequent to receive the configuration over one or more CSI-RS resources, the at least one CSI-RS; and transmitting, to the network node, the CSI report, wherein the CSI report is generated based on the configuration of the CSI report, wherein the CSI report comprises CSI feedback and an indication of two CSI-RS resources of the one or more CSI-RS resources, and wherein the CSI feedback is based on the two CSI-RS resources.

S29. The method of solution S27 or S28, wherein a first CSI-RS resource of the two CSI-RS resources is part of a first CSI-RS resource set, wherein a position of a second CSI-RS resource of the two CSI-RS resources in a second CSI-RS resource set is identical to a position of the first CSI-RS resource in the first CSI-RS resource set.

S30. The method of solution S27 or S28, wherein the two CSI-RS resources are neighboring CSI-RS resources in a same CSI-RS resource set.

S31. The method of solution S27 or S28, wherein the two CSI-RS resources belong to a same CSI-RS resource set, and wherein a difference in positions of the two CSI-RS resources in the same CSI-RS resource set is based on a number of CSI-RS resources in the same CSI-RS resource set.

S32. The method of any of solutions S29 to S31, wherein the CSI report comprises ports and coefficients associated with the two CSI-RS resources.

S33. A method of wireless communication, comprising transmitting, by a network node to a wireless device, a configuration of at least one channel state information (CSI) reference signal (RS) and a configuration of a CSI report; transmitting, based on the configuration over one or more CSI-RS resources, the at least one CSI-RS; and receiving, from the wireless device, the CSI report based on the configuration of the CSI report, wherein the CSI report comprises a precoding matrix indicator (PMI), and wherein a precoding matrix granularity is based on a density of the at least one CSI-RS.

S34. A method of wireless communication, comprising receiving, by a wireless device from a network node, a configuration of at least one channel state information (CSI) reference signal (RS) and a configuration of a CSI report; receiving, subsequent to receive the configuration over one or more CSI-RS resources, the at least one CSI-RS; and transmitting, to the network node, the CSI report, wherein the CSI report is generated based on the configuration of the CSI report, wherein the CSI report comprises a precoding matrix indicator (PMI), and wherein a precoding matrix granularity is based on a density of the at least one CSI-RS.

S35. The method of solution S33 or S34, wherein the density of the at least one CSI-RS is p resource elements per resource block per CSI-RS port, and wherein the PMI indicates one precoding matrix is assigned for each 1/p resource block, and wherein p is a positive number.

S36. A method of wireless communication, comprising transmitting, by a network node to a wireless device, a configuration of at least one channel state information (CSI) reference signal (RS) and a configuration of a CSI report; transmitting, based on the configuration over one or more CSI-RS resources, the at least one CSI-RS; and receiving, from the wireless device, the CSI report based on the configuration of the CSI report, wherein the CSI report comprising a precoding matrix indicator (PMI), wherein a precoding matrix associated with the PMI comprises a plurality of vectors, and wherein indexes of the plurality of vectors are mapped to the at least one CSI-RS.

S37. A method of wireless communication, comprising receiving, by a wireless device from a network node, a configuration of at least one channel state information (CSI) reference signal (RS) and a configuration of a CSI report; receiving, subsequent to receive the configuration over one or more CSI-RS resources, the at least one CSI-RS; and transmitting, to the network node, the CSI report, wherein the CSI report is generated based on the configuration of the CSI report, wherein the CSI report comprising a precoding matrix indicator (PMI), wherein a precoding matrix associated with the PMI comprises a plurality of vectors, and wherein indexes of the plurality of vectors are mapped to the at least one CSI-RS.

S38. The method of solution S36 or S37, wherein a vector of the plurality of vectors is mapped to a frequency unit of the one or more CSI-RS resources, and wherein an index of the vector is based on an index of the frequency unit.

S39. The method of solution S38, wherein the frequency unit is a resource block (RB) group.

S40. The method of solution S39, wherein resource blocks in the RB group are continuous.

S41. The method of solution S39, wherein resource blocks in the RB group are equally spaced.

S42. The method of solution S39, wherein the RB group comprises a plurality of RB sub-groups, wherein the plurality of RB sub-groups are equally spaced, and wherein the resource blocks in each of the RB sub-groups are continuous.

S43. The method of solution S36 or S37, wherein a vector of the plurality of vectors is mapped to a CSI-RS port of a plurality of CSI-RS ports associated with the one or more CSI-RS resources, and wherein an index of the vector is based on an index of the CSI-RS port.

S44. The method of solution S43, wherein the index of the plurality of vectors is incremented by one, and wherein the index of the plurality of CSI-RS ports is incremented by one.

S45. The method of solution S43, wherein the index of the plurality of vectors is incremented by N, wherein the index of the plurality of CSI-RS ports is incremented by one, and wherein N is a integer.

S46. The method of solution S43, wherein the index of the vector is further based on at least one parameter of the one or more CSI-RS resources.

S47. The method of solution S43, wherein the index of the vector is based on a combination of the index of the CSI-RS port and an index of the one or more CSI-RS resources.

S48. The method of solution S47, wherein the index of the plurality of vectors is incremented by one, and wherein the index of the plurality of CSI-RS ports is incremented by one.

S49. The method of solution S47, wherein the index of the plurality of vectors is incremented by N, wherein the index of the one or more CSI-RS resources is incremented by one, and wherein N is an integer.

S50. The method of solution S47, wherein the index of the plurality of vectors is incremented by one, and wherein the index of the one or more CSI-RS resources is incremented by one.

S51. The method of solution S43, wherein the index of the vector is based on a combination of the index of the CSI-RS port and an index of a frequency unit of the one or more CSI-RS resources.

S52. The method of solution S51, wherein the index of the plurality of vectors is incremented by N, wherein the index of the frequency unit is incremented by one, and wherein N is an integer.

S53. The method of solution S36 or S37, wherein the one or more CSI-RS resources are partitioned into one or more code division multiplexing (CDM) groups, wherein a vector of the plurality of vectors is mapped to a CDM group of the one or more CDM groups, and wherein an index of the vector is based on an index of the CDM group.

S54. The method of solution S53, wherein the index of the plurality of vectors is incremented by one, and wherein the index of the one or more CDM groups is incremented by one.

S55. The method of solution S53, wherein the index of the plurality of vectors is incremented by N, wherein the index of the one or more CDM groups is incremented by one, and wherein N is an integer.

S56. The method of solution S36 or S37, wherein a vector of the plurality of vectors is mapped to a CSI-RS port group of a plurality of CSI-RS port groups associated with the one or more CSI-RS resources, and wherein an index of the vector is based on an index of the CSI-RS port group.

S57. The method of solution S56, wherein the index of the plurality of vectors is incremented by one, and wherein the index of the plurality of CSI-RS port groups is incremented by one.

S58. The method of solution S56, wherein the index of the plurality of vectors is incremented by N, wherein the index of the plurality of CSI-RS port groups is incremented by one, and wherein N is an integer.

S59. The method of any of solutions S56 to S58, wherein the vector is a frequency vector.

S60. The method of solution S59, wherein each element of the vector is zero or one.

S61. The method of solution S56, wherein the CSI-RS port group comprises CSI-RS ports that are mapped to one or more code division multiplexing (CDM) groups.

S62. The method of solution S62, wherein the one or more CDM groups comprise M continuous CDM groups, and wherein M is a positive integer.

S63. The method of solution S56, wherein the index of the vector is further based on an index of a frequency unit of the one or more CSI-RS resources.

S64. A method of wireless communication, comprising transmitting, by a network node to a wireless device, a configuration of at least one channel state information (CSI) reference signal (RS) and a configuration of a CSI report; transmitting, based on the configuration over one or more CSI-RS resources, the at least one CSI-RS; and receiving, from the wireless device, the CSI report based on the configuration of the CSI report, wherein the CSI report comprises a precoding matrix indicator (PMI), wherein a precoding matrix associated with the PMI comprises a plurality of vectors that are mapped to the at least one CSI-RS, and wherein a bitmap indicates vectors that are mapped to the at least one CSI-RS and used in the precoding matrix.

S65. A method of wireless communication, comprising receiving, by a wireless device from a network node, a configuration of at least one channel state information (CSI) reference signal (RS) and a configuration of a CSI report; receiving, subsequent to receive the configuration over one or more CSI-RS resources, the at least one CSI-RS; and transmitting, to the network node, the CSI report, wherein the CSI report is generated based on the configuration of the CSI report, wherein the CSI report comprises a precoding matrix indicator (PMI), wherein a precoding matrix associated with the PMI comprises a plurality of vectors that are mapped to the at least one CSI-RS, and wherein a bitmap indicates vectors that are mapped to the at least one CSI-RS and used in the precoding matrix.

S66. The method of solution S64 or S65, wherein the plurality of vectors is mapped to the one or more CSI-RS resources, and wherein an index of a bit in the bitmap is based on an index of a frequency unit of the one or more CSI-RS resources mapped to a corresponding vector.

S67. The method of solution S66, wherein the frequency unit is a resource block (RB) group.

S68. The method of solution S67, wherein resource blocks in the RB group are continuous.

S69. The method of solution S67, wherein resource blocks in the RB group are equally spaced.

S70. The method of solution S67, wherein the RB group comprises a plurality of RB sub-groups, wherein the plurality of RB sub-groups are equally spaced, and wherein the resource blocks in each of the RB sub-groups are continuous.

S71. A method of wireless communication, comprising transmitting, by a network node to a wireless device, a configuration of at least one channel state information (CSI) reference signal (RS) and a configuration of a CSI report; transmitting, based on the configuration over one or more CSI-RS resources, the at least one CSI-RS; and receiving, from the wireless device, the CSI report based on the configuration of the CSI report, wherein the CSI report comprises a precoding matrix indicator (PMI), wherein a precoding matrix associated with the PMI comprises a plurality of vectors, and wherein each vector of the plurality of vectors conforms to a rule.

S72. A method of wireless communication, comprising receiving, by a wireless device from a network node, a configuration of at least one channel state information (CSI) reference signal (RS) and a configuration of a CSI report; receiving, subsequent to receive the configuration over one or more CSI-RS resources, the at least one CSI-RS; and transmitting, to the network node, the CSI report, wherein the CSI report is generated based on the configuration of the CSI report, wherein the CSI report comprises a precoding matrix indicator (PMI), wherein a precoding matrix associated with the PMI comprises a plurality of vectors, and wherein each vector of the plurality of vectors conforms to a rule.

S73. The method of solution S71 or S72, wherein the rule specifies (i) each element of the each vector is equal to one, or (ii) M continuous elements of the each vector is equal to one and remaining elements of the each vector are equal to zero, wherein M is a positive integer.

S74. The method of solution S73, wherein an element in a first position of a first vector of the plurality of vectors is one.

S75. A method of wireless communication, comprising transmitting, by a network node to a wireless device, a configuration of at least one channel state information (CSI) reference signal (RS) and a configuration of a CSI report; transmitting, based on the configuration over one or more CSI-RS resources, the at least one CSI-RS; and receiving, from the wireless device, the CSI report based on the configuration of the CSI report, wherein the CSI report comprises a precoding matrix indicator (PMI), wherein a precoding matrix associated with the PMI comprises a plurality of vectors, and wherein each vector of the plurality of vectors conforms to a rule.

S76. A method of wireless communication, comprising receiving, by a wireless device from a network node, a configuration of at least one channel state information (CSI) reference signal (RS) and a configuration of a CSI report; receiving, subsequent to receive the configuration over one or more CSI-RS resources, the at least one CSI-RS; and transmitting, to the network node, the CSI report, wherein the CSI report is generated based on the configuration of the CSI report, wherein the CSI report comprises a precoding matrix indicator (PMI), wherein a precoding matrix associated with the PMI comprises a plurality of vectors, and wherein each vector of the plurality of vectors conforms to a rule.

S77. The method of solution S75 or S76, wherein the rule specifies (i) each element of the each vector is equal to one, or (ii) equally spaced elements of the each vector are one and remaining elements of the each vector are equal to zero.

S78. The method of solution S77, wherein the CSI report further comprises a bitmap, wherein a bit of the bitmap corresponds to a vector of the plurality of vectors in the precoding matrix, and wherein an index of the bit is indicative of a position of a first "1" element in the corresponding vector.

S79. The method of any of solutions S1 to S78, wherein the network node is a gNodeB (gNB) and the wireless device is a user equipment (UE).

S80. A wireless communications apparatus comprising a processor and a memory, wherein the processor is configured to read code from the memory and implement a method recited in any of solutions S1 to S79.

S81. A computer program product comprising a computer-readable program medium code stored thereupon, the code, when executed by a processor, causing the processor to implement a method recited in any of solutions S1 to S79.

Figure 4:
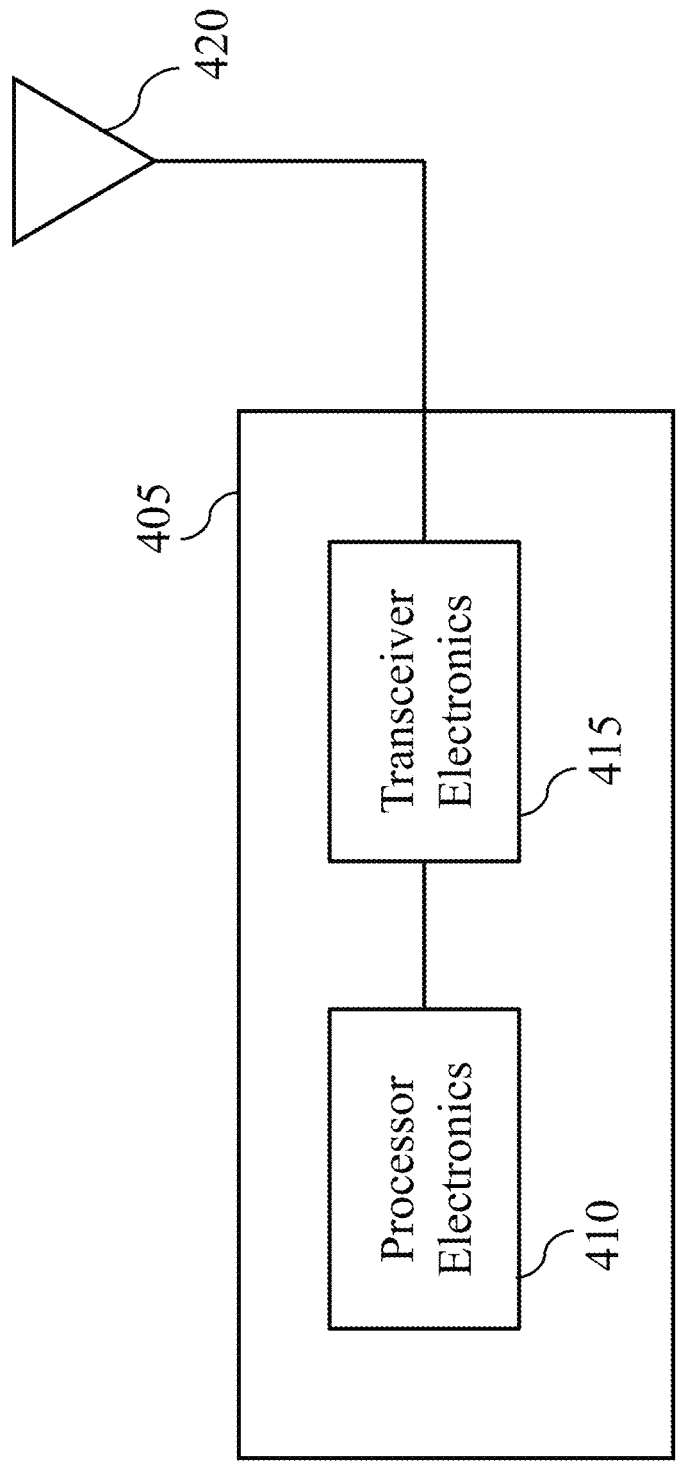
FIG. 4 is a block diagram representation of a portion of an apparatus, in accordance with some embodiments of the presently disclosed technology.

FIG. 4 is a block diagram representation of a portion of an apparatus, in accordance with some embodiments of the presently disclosed technology. An apparatus 405, such as a base station or a wireless device (or UE), can include processor electronics 410 such as a microprocessor that implements one or more of the techniques (including, but not limited to, methods 200 and 300) presented in this document. The apparatus 405 can include transceiver electronics 415 to send and/or receive wireless signals over one or more communication interfaces such as antenna(s) 420. The apparatus 405 can include other communication interfaces for transmitting and receiving data. Apparatus 405 can include one or more memories (not explicitly shown) configured to store information such as data and/or instructions. In some implementations, the processor electronics 410 can include at least a portion of the transceiver electronics 415. In some embodiments, at least some of the disclosed techniques, modules or functions are implemented using the apparatus 405.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
   transmitting, by a network node to a wireless device, a configuration of at least one channel state information (CSI) reference signal (RS) and a configuration of a CSI report,
   wherein the configuration of the at least one CSI-RS includes a number of CSI-RS ports mapped to a combination of vector pairs, and wherein the configuration of the CSI report includes a number of the vector pairs;
   transmitting, based on the configuration over one or more CSI-RS resources, the at least one CSI-RS; and
   receiving, from the wireless device, the CSI report based on the configuration of the CSI report, wherein the CSI report comprises a precoding matrix indicator (PMI), wherein a precoding matrix associated with the PMI comprises the combination of vector pairs mapped to the number of CSI-RS ports.

2. The method of claim 1, wherein a plurality of vectors are mapped to the at least one CSI-RS by a bitmap that indicates the plurality of vectors in the precoding matrix.

3. The method of claim 2, wherein a vector of the plurality of vectors is mapped to a resource block (RB) group of the one or more CSI-RS resources, and wherein an index of the vector or an index of the bitmap is based on an index of the RB group.

4. The method of claim 2, wherein a vector of the plurality of vectors is mapped to a CSI-RS port of a plurality of CSI-RS ports associated with the one or more CSI-RS resources, wherein an index of the vector or an index of the bitmap is based on an index of the CSI-RS port, and wherein the index of the vector or the index of the bitmap is incremented by N as the index of the CSI-RS port is incremented by one, N being an integer.

5. The method of claim 2, wherein the one or more CSI-RS resources are partitioned into one or more code division multiplexing (CDM) groups, wherein a vector of the plurality of vectors is mapped to a CDM group of the one or more CDM groups, wherein an index of the vector or an index of the bitmap is based on an index of the CDM group, and wherein the index of the vector or the index of the bitmap is incremented by N as the index of the CDM group is incremented by one, N being an integer.

6. A method of wireless communication, comprising:
   receiving, by a wireless device from a network node, a configuration of at least one channel state information (CSI) reference signal (RS) and a configuration of a CSI report,
   wherein the configuration of the at least one CSI-RS includes a number of CSI-RS ports mapped to a combination of vector pairs, and wherein the configuration of the CSI report includes a number of the vector pairs;
   receiving, subsequent to receiving the configuration over one or more CSI-RS resources, the at least one CSI-RS; and
   transmitting, to the network node, the CSI report, wherein the CSI report is generated based on the configuration of the CSI report, wherein the CSI report comprises a precoding matrix indicator (PMI), wherein a precoding matrix associated with the PMI comprises the combination of vector pairs mapped to the number of CSI-RS ports.

7. The method of claim 6, wherein a plurality of vectors are mapped to the at least one CSI-RS by a bitmap that indicates the plurality of vectors in the precoding matrix.

8. The method of claim 7, wherein a vector of the plurality of vectors is mapped to a resource block (RB) group of the one or more CSI-RS resources, and wherein an index of the vector or an index of the bitmap is based on an index of the RB group.

9. The method of claim 7, wherein a vector of the plurality of vectors is mapped to a CSI-RS port of a plurality of CSI-RS ports associated with the one or more CSI-RS resources, wherein an index of the vector or an index of the bitmap is based on an index of the CSI-RS port, and wherein the index of the vector or the index of the bitmap is incremented by N as the index of the CSI-RS port is incremented by one, N being an integer.

10. The method of claim 7, wherein the one or more CSI-RS resources are partitioned into one or more code division multiplexing (CDM) groups, wherein a vector of the plurality of vectors is mapped to a CDM group of the one or more CDM groups, wherein an index of the vector or an index of the bitmap is based on an index of the CDM group, and wherein the index of the vector or the index of the bitmap is incremented by N as the index of the CDM group is incremented by one, N being an integer.

11. An apparatus for wireless communication comprising a processor and a memory storing instructions, execution of which by the processor causes the apparatus to:
- transmit, to a wireless device, a configuration of at least one channel state information (CSI) reference signal (RS) and a configuration of a CSI report,
- wherein the configuration of the at least one CSI-RS includes a number of CSI-RS ports mapped to a combination of vector pairs, and wherein the configuration of the CSI report includes a number of the vector pairs;
- transmit, based on the configuration over one or more CSI-RS resources, the at least one CSI-RS; and
- receive, from the wireless device, the CSI report based on the configuration of the CSI report, wherein the CSI report comprises a precoding matrix indicator (PMI), wherein a precoding matrix associated with the PMI comprises the combination of vector pairs mapped to the number of CSI-RS ports.

12. The apparatus of claim 11, wherein a plurality of vectors are mapped to the at least one CSI-RS by a bitmap that indicates the plurality of vectors in the precoding matrix.

13. The apparatus of claim 12, wherein a vector of the plurality of vectors is mapped to a resource block (RB) group of the one or more CSI-RS resources, and wherein an index of the vector or an index of the bitmap is based on an index of the RB group.

14. The apparatus of claim 12, wherein a vector of the plurality of vectors is mapped to a CSI-RS port of a plurality of CSI-RS ports associated with the one or more CSI-RS resources, wherein an index of the vector or an index of the bitmap is based on an index of the CSI-RS port, and wherein the index of the vector or the index of the bitmap is incremented by N as the index of the CSI-RS port is incremented by one, N being an integer.

15. The apparatus of claim 12, wherein the one or more CSI-RS resources are partitioned into one or more code division multiplexing (CDM) groups, wherein a vector of the plurality of vectors is mapped to a CDM group of the one or more CDM groups, wherein an index of the vector or an index of the bitmap is based on an index of the CDM group, and wherein the index of the vector or the index of the bitmap is incremented by N as the index of the CDM group is incremented by one, N being an integer.

16. An apparatus for wireless communication comprising a processor and a memory storing instructions, execution of which by the processor causes the apparatus to:
- receive, from a network node, a configuration of at least one channel state information (CSI) reference signal (RS) and a configuration of a CSI report,
- wherein the configuration of the at least one CSI-RS includes a number of CSI-RS ports mapped to a combination of vector pairs, and wherein the configuration of the CSI report includes a number of the vector pairs;
- receive, subsequent to receiving the configuration over one or more CSI-RS resources, the at least one CSI-RS; and
- transmitting, to the network node, the CSI report, wherein the CSI report is generated based on the configuration of the CSI report, wherein the CSI report comprises a precoding matrix indicator (PMI), wherein a precoding matrix associated with the PMI comprises the combination of vector pairs mapped to the number of CSI-RS ports.

17. The apparatus of claim 16, wherein a plurality of vectors are mapped to the at least one CSI-RS by a bitmap that indicates the plurality of vectors in the precoding matrix.

18. The apparatus of claim 17, wherein a vector of the plurality of vectors is mapped to a resource block (RB) group of the one or more CSI-RS resources, and wherein an index of the vector or an index of the bitmap is based on an index of the RB group.

19. The apparatus of claim 17, wherein a vector of the plurality of vectors is mapped to a CSI-RS port of a plurality of CSI-RS ports associated with the one or more CSI-RS resources, wherein an index of the vector or an index of the bitmap is based on an index of the CSI-RS port, and wherein the index of the vector or the index of the bitmap is incremented by N as the index of the CSI-RS port is incremented by one, N being an integer.

20. The apparatus of claim 17, wherein the one or more CSI-RS resources are partitioned into one or more code division multiplexing (CDM) groups, wherein a vector of the plurality of vectors is mapped to a CDM group of the one or more CDM groups, wherein an index of the vector or an index of the bitmap is based on an index of the CDM group, and wherein the index of the vector or the index of the bitmap is incremented by N as the index of the CDM group is incremented by one, N being an integer.

* * * * *